United States Patent [19]

Oestreich

[11] 4,359,857

[45] Nov. 23, 1982

[54] DEVICE FOR COVERING STRANDING ELEMENTS

[75] Inventor: Ulrich Oestreich, Munich, Fed. Rep. of Germany

[73] Assignee: Siemens Aktiengesellschaft, Berlin & Munich, Fed. Rep. of Germany

[21] Appl. No.: 229,169

[22] Filed: Jan. 28, 1981

[30] Foreign Application Priority Data

Feb. 18, 1980 [DE] Fed. Rep. of Germany ....... 3006055

[51] Int. Cl.³ .................... H01B 13/04; D07B 3/00
[52] U.S. Cl. ............................................. 57/18; 57/6;
57/293; 57/294
[58] Field of Search .................... 57/6, 16–18, 57/293, 294, 314

[56] References Cited

U.S. PATENT DOCUMENTS

| | | | |
|---|---|---|---|
| 3,701,244 | 10/1972 | Dismon et al. | 57/18 |
| 3,724,190 | 4/1973 | Balbatun et al. | 57/18 |
| 3,847,190 | 11/1974 | Forester | 57/293 X |
| 4,041,683 | 8/1977 | Heimlicher | 57/18 |
| 4,209,966 | 7/1980 | Sutor et al. | 57/6 |
| 4,214,430 | 7/1980 | Vogelsberg et al. | 57/6 |
| 4,266,398 | 5/1981 | Vogelsberg | 57/6 X |

FOREIGN PATENT DOCUMENTS

| | | |
|---|---|---|
| 2053957 | 4/1972 | Fed. Rep. of Germany . |
| 2411151 | 9/1975 | Fed. Rep. of Germany . |
| 2632986 | 7/1978 | Fed. Rep. of Germany . |
| 828037 | 5/1939 | France . |
| 1123137 | 8/1968 | United Kingdom . |

Primary Examiner—John Petrakes
Attorney, Agent, or Firm—Hill, Van Santen, Steadman, Chiara & Simpson

[57] ABSTRACT

A device for covering stranding elements with a cover or retaining spiral characterized by a spinning member being carried on a first tube which is supported for rotation on a support tube and a pipe store capable of SZ stranding of elements into the interior of the support tube and terminating in a stranding disc which is supported for rotation in the first tube and removably attached to the end of the pipe store so that the elements being stranded pass through the interior of the support tube as the spinning member applies the retaining spiral or cover.

8 Claims, 1 Drawing Figure

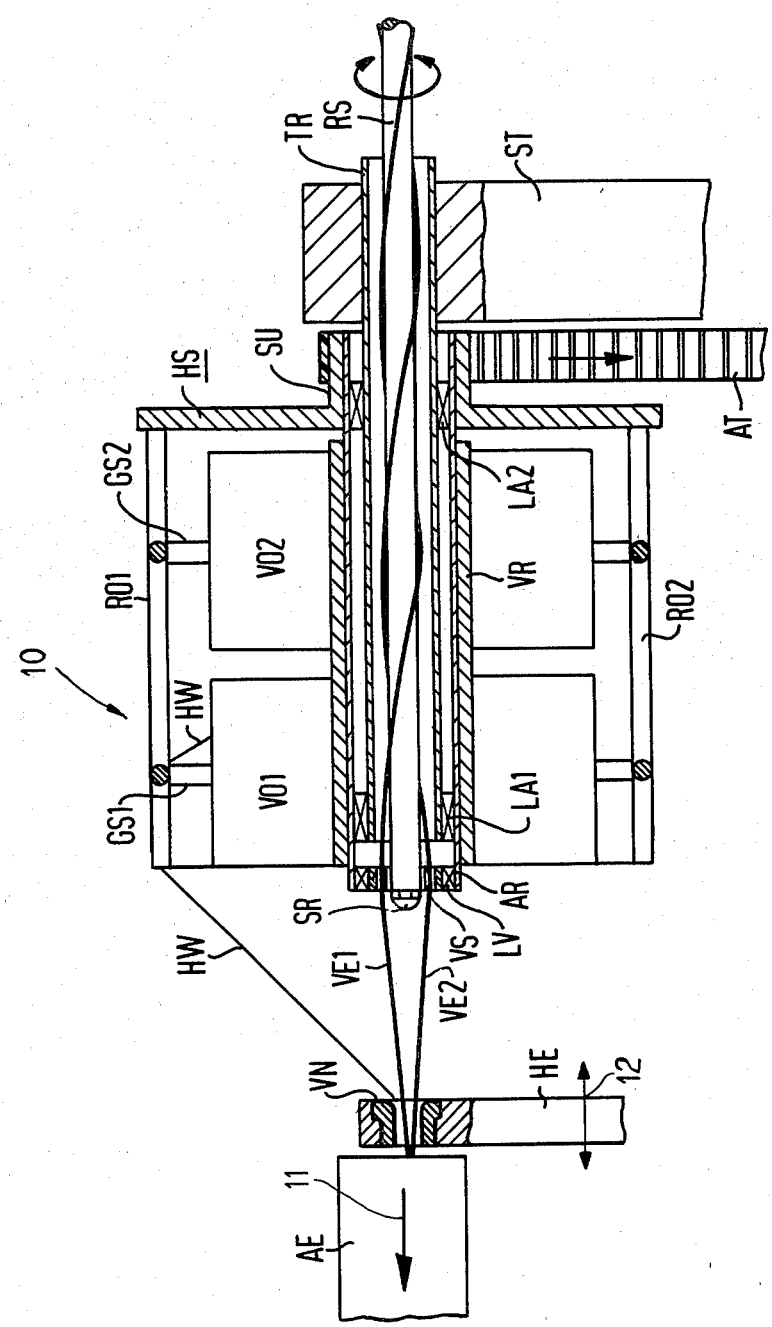

DEVICE FOR COVERING STRANDING ELEMENTS

BACKGROUND OF THE INVENTION

The present invention is directed to a device for covering stranding elements such as by applying a cover or retaining spiral on elements which pass through the interior of a support tube which supports a spinning member of the device.

German O.S. No. 20 53 957 discloses a device in which a cover such as a retaining spiral is applied to stranding elements as they pass through a support tube on which a spinning member of the device is mounted. However, the reference is silent as to how the elements are stranded together. In the known arrangement, an additional free rotating store for the material to be spun on is provided and the neighboring spinner is alternately rotated first in one direction and then in the other direction by a separate drive. By so doing, a type of SZ covering of the stranding elements can be realized. Here a SZ retaining spiral is applied to the finished material which has already been stranded. In principle, the spinner is a variation of a central spinner.

Given SZ stranding of the stranding elements, the distance between the point of stranding of the elements and the application of the covering should be reduced as mush as possible. By so doing problems particularly occurring with short lengths of a lay could be eliminated. Due to the resilient portion of the stranded element or skein together with the retaining spiral, these problems are that some of the lays in the store are not employed.

SUMMARY OF THE INVENTION

The present invention is directed to providing a device for applying a covering such as a retaining spiral onto stranded elements which device has a compact structure and is able to execute the stranding of the elements in a particular regular and effective manner.

These objects are achieved by an improvement in a device for covering which device has means for applying a retaining spiral including a rotatable spinning member arranged on a stationary support tube with the stranded elements being passed through the inside of the support tube. The improvements comprise said spinning member being carried on a first tube, said first tube being concentrically supported for rotation on the stationary support tube, and said device including means for SZ stranding of the elements including a pipe store mounted for rotation on the axis of the stationary support tube with at least a portion of the pipe store extending into the support tube and an exit end of the store being disposed adjacent a first end of the support tube, and a stranding disc being supported by a bearing in the interior of the first tube adjacent the first end of a support tube, said disc being removably attached to the exit end of the pipe store.

Thus, the pipe store and the spinning member for applying a retaining spiral are concentrically arranged so that the distance to the stranding nipple and the take-down device is minimized. Since the pipe store extends into the interior of the fixed support tube for the spinning member and the stranding disc is attached adjacent the end of the support tube, no additional space between the stranding disc and stranding nipple with the pull-off means is required for the placement of a spiral spinner.

In order to enable disassembly of the pipe store from the support tube, the stranding nipple and its associated pulling off means or device are preferably mounted for displacement along the axis of the store device. Thus, the stranding nipple can be moved to a position closely adjacent the exit end of the pipe store or move in an opposite direction to enable providing the desired space for disassembly.

In the preferred embodiment, the exit end of the pipe store terminates substantially in the same plane as the discharged end of the means for applying the retaining spiral. In addition, the first tube is mounted for rotation on the support tube by a pair of spaced bearings and the means for spinning may be provided with an appropriate drive enabling rotation on the axis of the support tube.

BRIEF DESCRIPTION OF THE FIGURE

The FIGURE is a schematic illustration of an embodiment of the device of the present invention.

DESCRIPTION OF THE PREFERRED EMBODIMENTS

The principles of the present invention are particularly useful when incorporating a device for applying a covering or retaining spiral on the stranded elements which device is generally indciated at 10 in the FIGURE.

The device 10 includes a rotary spinner HS and means for SZ stranding which includes a pipe store RS having a stranding disc VS at its exit end, a stranding nozzle or nipple VN and a pull off means AE. The SZ stranding means may be used to strand any number of elements however in the drawings, only two elements VE1 and VE2 are shown for purposes of illustration.

It is also noted that the right-hand side of the rod-like or cylindrical pipe store RS is not illustrated and this side would include bearings cooperating with the bearing LV which supports the stranding disc VS and enables the store and disc to rotate on the axis of the store RS. In addition, the right-hand side would also include the means for rotating the store in either direction about its axis. In order to place the elements such as VE1 and VE2 on the store RS, an inlet stranding disc is often provided.

On the left-hand side, it is noted that the stranding disc VS is rigidly connected to the exit end of the store or pipe-like store RS and is supported for rotation in a first tube or outer tube AR by the bearing LV. The stranding disc VS will exhibit an axial bore for each of the elements such as VE1 and VE2 which are being stranded by the stranding means. To removably secure the disc VS on the pipe store RS, a nut SR is utilized. Thus, the stranding disc VS can be disassembled in a simple manner by relasing the nut RS and the outside bearing LV can also be removed. This enables an easy threading of the stranding elements through the apertures of the stranding disc.

The stranding nipple VN is secured in a holder HE and the pull-off means AE is provided at the output of the nipple. The pull-off means AE prevents applying torsion to the stranded elements being pulled through the nipple VN. The pull-off means AE is designed for example, in the form of a bead and the stranding nipple VN together with its holder HE are mounted by means which enables independent displacement along the axis of the store RS particularly to the left as indicated by the arrows 11 and 12 so that sufficient space is available for the assembly of the elements of the device on the right-hand side of the drawing. On the other hand, the stranding nipple VN can be moved very close to the exit end of the pipe store RS and the stranding disc VS during a stranding operation. The stranding disc itself can be interchanged as needed in a simple manner. For example, for changing the length of the lay selection or for changing the number of stranding elements because the member or elements HE, VN, AE are designed so that they can be shifted as mentioned hereinabove.

A support pipe or tube TR is firmly mounted in a stationary standard ST and coaxially receives the pipe store RS. The diameter of the support tube TR is selected to be large enough that sufficient space is provided inside of it for the stranding of the stranding elements such as VE1 and VE2. A first bearing LA1 is provided at the first or outer end of the support tube TR which is adjacent to the stranding disc VS and a second bearing LA2 is disposed at the input or opposite end which is adjacent the stationary standard ST. These bearings LA1 and LA2 rotatably support the first tube AR which carries and support the rotatable spinning means HS which has a hub SU at its one end. The hub SU receives a tooth belt AT of the drive means for the spinning means.

The spinning means or member HS is designed as a central spinner and itself can be designed with a pot or cage-shape. As illustrated, it has rods RO1 and RO2 which are distributed along the circumference of the member and extend in an axial direction. Also, annular mounts or cradle parts such as GS1 and GS2 are provided so that the spinning member has a lantern configuration. Two supply spools or cops VO1 and VO2 are attached and mounted on the inside of the case-like body. As illustrated, it is assumed that the retaining spiral HW is being supplied by the spool VO1 while the other spool VO2 is held in reserve. The retaining spiral HW moves via the known spools or on the outside of the cage and proceeds axially therealong to the discharged end which is substantially adjacent the exit end of the store RS. From the discharged end, the material from the spiral moves in an oblique direction to the stranding nipple VN where the retaining spiral is applied in a suitable manner to the bunch consisting of the individual stranding elements VE1, VE2 or is applied to the stranded core. As mentioned above, the outer or first tube AR which is supported by bearings LA1 and LA2 and carries the spinning member is coaxial with the tube TR and the pipe store RS. Moreover, a further free spinning member or pipe VR may be provided in a standard manner as the center of the spinning means HS. The additional tube or pipe VR enables relative motion of the spiral cops with respect to the spinning cage as possible. The pipe such as VR can be either separately driven in a known manner which is not illustrated or braked with respect to the spinning member or first tube AR.

The illustrated arrangement is distinguished by the particular compact structure because the same overall length is exploited twice because the pipe store RS is concentrically arranged within the supporting pipe TR for the spinning means HS. Since a small distance between the stranding disc VS and the stranding nipple VN is possible, the length of lay is sufficiently defined even given short lengths of lay and an undesirable resilient portions of the stranding elements such as VE1 and VE2 while being stranded into a bunch can be largely avoided without requiring any additional auxiliary means. The illustrated means for applying the retaining spiral is held solely by the supporting tube or pipe TR which at the same time also assumes the function of being a bearing for the pipe store RS at its exit end. Together with the bearing LV, the stranding disc VS is seated at the discharged end or exit end of the store RS and can be easily taken off during a setting up of the machine. The pull off means AE on the other hand can be moved as close as possible to the stranding nipple holder HE because the two parts AE and AG can be displaced along the axis of the store RS. The stranding nipple VN is employed both for stranding the leads which are to be stranded and for the application of the retaining spiral HW. Uniform lengths of lay, which could otherwise only be achieved with long lay stranding, can be achieved with the illustrated stranding device. Thus, the device can achieve the lengths of the lay which are prescribed for electrical and mechanical reasons for cable to be produced by the device.

Although various minor modifications may be suggested by those versed in the art, it should be understood that I wish to embody within the scope of the patent granted hereon all such modifications as reasonably and properly come within the scope of my contribution to the art.

I claim:

1. In a device for covering stranded elements with a retaining spiral, said device having a stationary support tube and means for applying the retaining spiral including a rotatable spinning member arranged on said stationary support tube with the elements to be stranded being passed through the inside of said support tube, the improvements comprising a first outer tube and said spinning member being carried on said first outer tube, said first outer tube being concentrically supported for rotation on the stationary support tube, said device includes means for SZ stranding of the elements including a pipe store mounted for rotation coaxially to and inside of the stationary support tube with at least a portion of the pipe store extending into the support tube and an exit end of the pipe store being disposed adjacent a first end of the support tube, a bearing and a stranding disc being supported by said bearing in the interior of the first outer tube adjacent the first end of the support tube, said disc being removably attached to the exit end of the pipe store, said elements to be stranded being placed on the pipe store and the diameter of the support tube being selected to be large enough to provide sufficient space inside of the support tube for the elements to be stranded to move along the pipe store.

2. In a device according to claim 1, which includes a pair of bearings and wherein said first outer tube is mounted for rotation on said support tube by said pair of bearings.

3. In a device according to claim 1, wherein the exit end of the pipe store terminates substantially at the discharge end of the means for applying the retaining spiral.

4. In a device according to claim 3, wherein said means for stranding including a stranding nipple closely adjacent the exit end of the pipe store and means for pulling-off the stranded elements being disposed on the opposite side of said nipple, said means for pulling-off being capable of preventing torsion of the stranded units of elements.

5. In a device according to claim 4, wherein the stranding nipple and the means for pulling-off are mounted for displacement along the axis of the pipe store.

6. In a device according to claim 1, wherein the means for spinning is provided with an appropriate drive enabling rotation on the axis of the support tube.

7. In a device according to claim 1, which includes a stranding nipple disposed adjacent the exit end of the pipe store and means for pulling off the elements being disposed on the other side of said stranding nipple.

8. In a device according to claim 7, wherein both the stranding nipple and the means for pulling off are mounted for displacement along the axis of the pipe store.

* * * * *